US009754449B2

(12) United States Patent
Thacker et al.

(10) Patent No.: US 9,754,449 B2
(45) Date of Patent: *Sep. 5, 2017

(54) GAMING SYSTEMS AND METHODS FOR USE IN PROVIDING RANDOM REWARDS TO MULTIPLE PLAYERS

(71) Applicant: Video Gaming Technologies, Inc., Franklin, TN (US)

(72) Inventors: Christopher John Thacker, Earlysville, VA (US); Daniel William Milligan, Palmyra, VA (US)

(73) Assignee: Video Gaming Technologies, Inc., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,654

(22) Filed: Jul. 1, 2014

(65) Prior Publication Data

US 2014/0315628 A1 Oct. 23, 2014

Related U.S. Application Data

(63) Continuation of application No. 13/524,648, filed on Jun. 15, 2012, now Pat. No. 8,764,550.

(51) Int. Cl.

| | |
|---|---|
| ***G06F 17/00*** | (2006.01) |
| ***G06F 19/00*** | (2011.01) |
| ***G07F 17/32*** | (2006.01) |

(52) U.S. Cl.

CPC ...... *G07F 17/3244* (2013.01); *G07F 17/3262* (2013.01); *G07F 17/3272* (2013.01)

(58) Field of Classification Search

CPC .. G07F 17/32; G07F 17/3225; G07F 17/3227; G07F 17/323; G07F 17/3244; G07F 17/3255; G07F 17/3258; G07F 17/326; G07F 17/3262; G07F 17/3272; G07F 17/3281; G07F 17/3286

USPC ............................ 463/16–20, 25, 29, 40–43

See application file for complete search history.

(56) References Cited

U.S. PATENT DOCUMENTS

| | | | |
|---|---|---|---|
| 5,941,773 | A | 8/1999 | Harlick |
| 6,217,448 | B1 | 4/2001 | Olsen |
| 6,364,768 | B1 | 4/2002 | Acres et al. |
| 6,656,048 | B2 | 12/2003 | Olsen |

(Continued)

FOREIGN PATENT DOCUMENTS

| | | | |
|---|---|---|---|
| WO | 0032286 | A1 | 6/2000 |
| WO | 2010056715 | A1 | 5/2010 |

*Primary Examiner* — Milap Shah

(74) *Attorney, Agent, or Firm* — Armstrong Teasdale LLP

(57) ABSTRACT

Gaming servers and methods for use in providing a random reward to multiple players are disclosed. One exemplary method includes randomly shuffling bonus values between each of the plurality of gaming machines participating in the random reward, wherein the random reward includes a trigger condition triggering the random reward, upon shuffling the bonus values between each of the plurality of gaming machines. The method further includes determining if the trigger condition is satisfied by one of the plurality of gaming machines, and in response to the trigger condition being satisfied, awarding, at the gaming server, the random reward based on a final bonus value randomly shuffled to the one of the plurality of gaming machines from amongst each of the bonus values at a time the random reward is triggered.

21 Claims, 5 Drawing Sheets

(56) References Cited

U.S. PATENT DOCUMENTS 6,811,486 B1 11/2004 Luciano, Jr.
6,966,834 B1 11/2005 Johnson
7,048,628 B2 5/2006 Schneider
7,632,184 B2 12/2009 Gauselmann
7,666,081 B2 2/2010 Baerlocher et al.
7,758,423 B2 7/2010 Foster et al.
7,883,407 B2 2/2011 Johnson
2003/0036430 A1 2/2003 Cannon
2003/0078088 A1 4/2003 Schneider
2003/0162584 A1* 8/2003 Hughs-Baird et al. ......... 463/20
2004/0204226 A1 10/2004 Foster et al.
2005/0221887 A1 10/2005 Gomes
2006/0046821 A1* 3/2006 Kaminkow et al. ............ 463/16
2006/0116187 A1 6/2006 Johnson et al.
2007/0087805 A1 4/2007 Taylor
2007/0265066 A1 11/2007 Curry et al.
2007/0298857 A1 12/2007 Schlottmann et al.
2007/0298873 A1 12/2007 Nguyen et al.
2008/0070694 A1 3/2008 Schlottmann et al.
2008/0220841 A1 9/2008 Gagner et al.
2009/0011822 A1 1/2009 Englman et al.
2009/0011823 A1 1/2009 Englman et al.
2009/0011824 A1 1/2009 Englman et al.
2009/0042636 A1 2/2009 Taylor
2009/0117999 A1 5/2009 Johnson et al.
2009/0124325 A1 5/2009 Wadleigh et al.
2009/0124345 A1 5/2009 Gilmore et al.
2009/0124385 A1* 5/2009 Cuddy et al. ................... 463/42
2009/0197684 A1 8/2009 Arezina et al.
2009/0270173 A1 10/2009 Christensen
2009/0305770 A1 12/2009 Bennett et al.
2010/0291991 A1 11/2010 Baerlocher et al.
2011/0092278 A1 4/2011 Johnson
2011/0105233 A1* 5/2011 Aoki ............................... 463/42
2011/0130196 A1 6/2011 Parham et al.
2012/0115593 A1* 5/2012 Vann et al. ..................... 463/26
2013/0165230 A1 6/2013 Thacker et al.

* cited by examiner

GAMING SYSTEMS AND METHODS FOR USE IN PROVIDING RANDOM REWARDS TO MULTIPLE PLAYERS

CROSS REFERENCE TO RELATED APPLICATIONS

This application is a continuation of U.S. patent application Ser. No. 13/524,648, filed Jun. 15, 2012, which is incorporated herein by reference in its entirety.

BACKGROUND OF THE INVENTION

The embodiments described herein relate generally to gaming systems and, more particularly, to methods and systems for assigning bonus values associated with a random reward to one or more gaming machines.

At least some known gaming machines provide a primary game and a secondary game. For example, a secondary game may include free plays that are associated with a probability of a payout and do not require a player to deposit money or credits to the gaming machine. A secondary game may be triggered by a condition, such as a particular combination of symbols associated with a primary play outcome in the primary game. A number of different secondary games are known. For example, secondary jackpots may be used by gaming entities to encourage additional play from one or more players. An example of a secondary game is a progressive jackpot, which grows incrementally as players continue to wager at those slot machines that are linked to the progressive jackpot. Progressive jackpots are generally known as being geographically limited to a casino, are not guaranteed to payout, and are open to any player within the casino. As such, players wanting to play the progressive jackpot may be limited to only playing selected slot machines at the same casino.

BRIEF DESCRIPTION OF THE INVENTION

In one aspect, a method for use in providing a random reward is disclosed. The method includes randomly shuffling bonus values between each of the plurality of gaming machines participating in the random reward, wherein the random reward includes a trigger condition triggering the random reward, upon shuffling the bonus values between each of the plurality of gaming machines, determining if the trigger condition is satisfied by one of the plurality of gaming machines, and in response to the trigger condition being satisfied, awarding, at the gaming server, the random reward based on a final bonus value randomly shuffled to the one of the plurality of gaming machines from amongst each of the bonus values at a time the random reward is triggered.

In another aspect, a gaming system is disclosed. The gaming system includes a plurality of gaming machines. Each of the plurality of gaming machines is configured to display a bonus value. A gaming server coupled to the plurality of gaming machines is configured to randomly shuffle bonus values between each of the plurality of gaming machines participating in the random reward, wherein the random reward includes a trigger condition triggering the random reward, upon shuffling the bonus values between each of the plurality of gaming machines, determining if the trigger condition is satisfied by one of the plurality of gaming machines, and in response to the trigger condition being satisfied, awarding the random reward based on a final bonus value randomly shuffled to the one of the plurality of gaming machines from amongst each of the bonus values at a time the random reward is triggered.

In yet another aspect, one or more non-transitory computer-readable storage media having computer-executable instructions embodied thereon is disclosed. When executed by one or more processors, the computer-executable instructions cause the processor to perform the steps of randomly shuffling bonus values between each of the plurality of gaming machines participating in the random reward, wherein the random reward includes a trigger condition triggering the random reward, upon shuffling the bonus values between each of the plurality of gaming machines, determining if the trigger condition is satisfied by one of the plurality of gaming machines, and in response to the trigger condition being satisfied, awarding, at the gaming server, the random reward based on a final bonus value randomly shuffled to the one of the plurality of gaming machines from amongst each of the bonus values at a time the random reward is triggered.

DETAILED DESCRIPTION OF THE INVENTION

Exemplary embodiments of systems and methods for use in providing random rewards to multiple players are provided herein. Such embodiments may provide an enhanced gaming experience, in particular where a gaming machine is assigned a dynamic bonus value. The dynamic bonus value associated with the random reward may be shuffled among gaming machines, or new bonus values may be generated for the gaming machines. The systems and methods described herein may further enable varying the participation of gaming machines in random rewards.

Exemplary technical effects of systems and methods described herein include at least one of: (a) assigning a bonus value to each of a plurality of gaming machines participating in a random reward, wherein the random reward includes at least one trigger condition, (b) assigning a different bonus value to each of a portion of the plurality of gaming machines associated with a random reward after a predetermined interval, (c) triggering the random reward when the at least one trigger condition is satisfied by one of the plurality of gaming machines, and (d) awarding the random reward based on the bonus value assigned to said one of the plurality of gaming machines, when the random reward is triggered.

Figure 1:
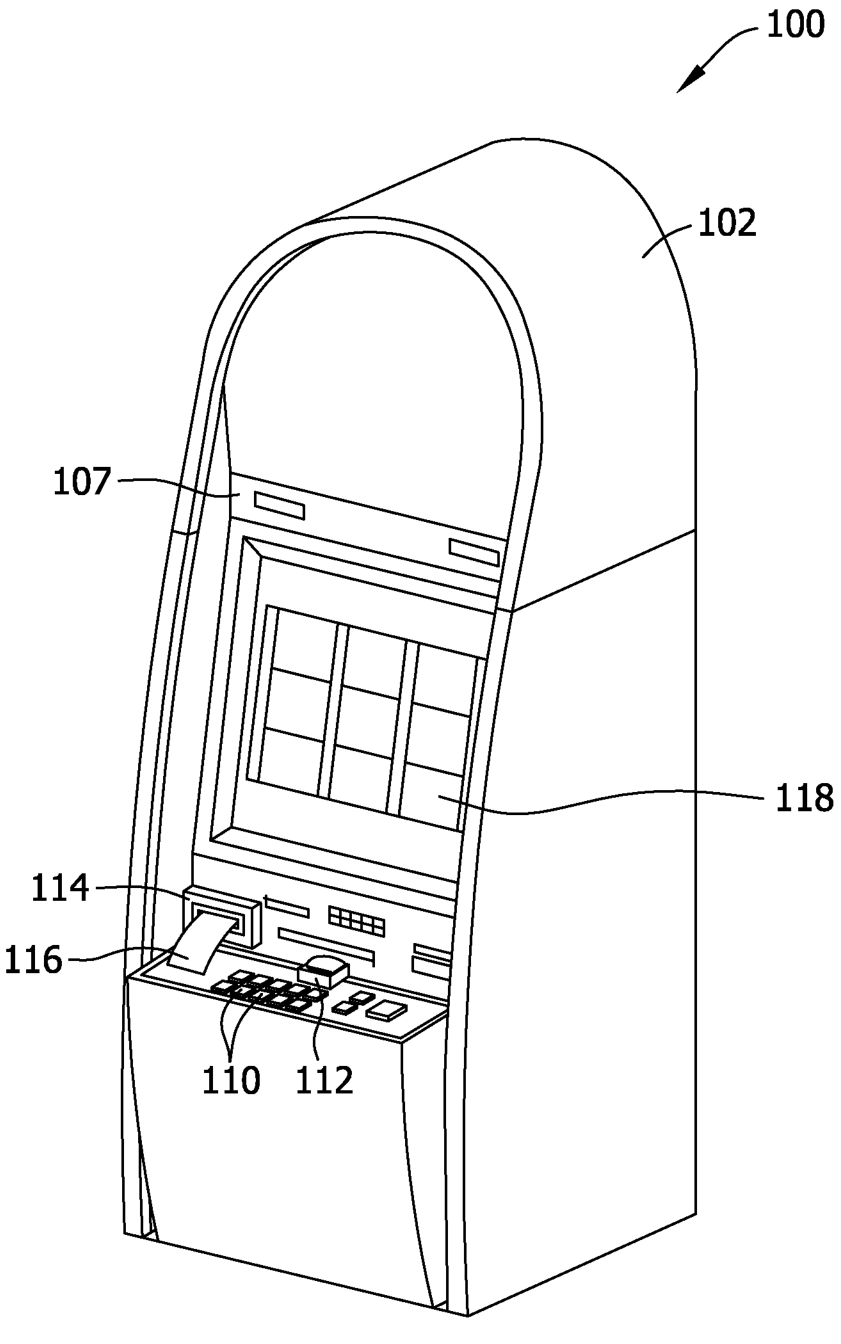
FIG. 1 is a perspective view of an exemplary gaming machine.

FIG. 1 is a schematic diagram of an exemplary gaming machine 100. Machine 100 may be any type of gaming machine, and may include structures different than those shown in FIG. 1. In various embodiments, gaming machine 100 includes, without limitation, video bingo machines, video poker machines, video slot machines, and/or other similar gaming machines that implement other recognized casino and/or entertainment games.

Figure 2:
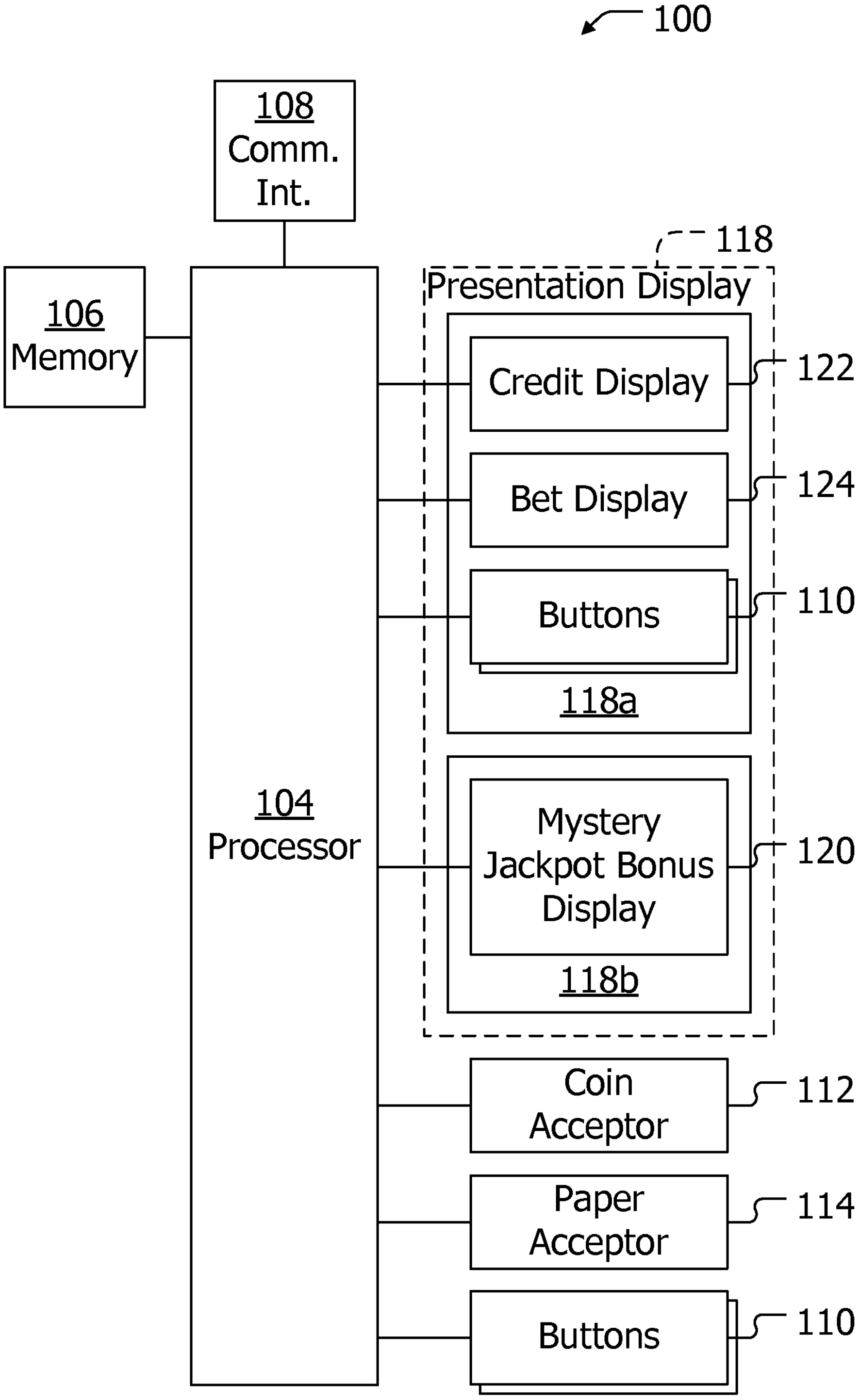
FIG. 2 is a block diagram of the exemplary gaming machine shown in FIG. 1.

In the exemplary embodiment, gaming machine 100 includes a cabinet 102 configured to at least partially enclose and/or support a plurality of components, such as, but not limited to, a processor, peripheral devices, presentation devices, and player interaction devices. FIG. 2 illustrates a block diagram of at least a portion of the components (described in more detail below) of gaming machine 100. As illustrated, gaming machine 100 includes a processor 104 that is communicatively coupled to a memory 106. In the exemplary embodiment, processor 104 and memory device 106 are enclosed within cabinet 102. Gaming machine 100 is configurable and/or programmable to perform one or more operations described herein by programming processor 104. For example, processor 104 may be programmed by encoding an operation as one or more executable instructions and providing the executable instructions in memory 106. The term "processor", as used herein, refers to central processing units, microprocessors, microcontrollers, reduced instruction set circuits (RISC), application specific integrated circuits (ASIC), logic circuits, and any other circuit or processor capable of executing instructions. It should be appreciated that processor 104 may further include a plurality of the exemplary components listed above. Processor 104 may be programmed to perform, alone or in combination, any of the processes, methods or functions described herein.

Memory 106 stores instructions, executable by processor 104, for controlling gaming machine 100. For example, in the exemplary embodiment, memory 106 stores data such as a status of the random reward, player tracking account information, eligibility status of gaming machine 100, bonus values, random or pseudo-random number generation software, pay table data, and/or other information or applicable gaming rules that relate to game play on gaming machine 100. Memory 106 may include, without limitation, random access memory (RAM), read-only memory (ROM), flash memory, and/or electrically erasable programmable read-only memory (EEPROM). In some embodiments, other suitable magnetic, optical, and/or semiconductor-based memory may be included in memory device 106 by itself or in combination. In at least one embodiment, memory 106 includes multiple components, with at least one incorporated with processor 104.

Gaming machine 100 includes a communication interface 108 to enable communication with one or more other gaming machines 100 and/or a gaming server (as described below), directly and/or through a network.

Gaming machine 100 includes a plurality of switches and/or buttons 110 that are coupled to a front 107 of cabinet 102. Buttons 110 may be used to start play of a primary or secondary game. One button 110 may be a "Bet One" button that enables the player to place a bet or to increase a bet. Another button 110 may be a "Bet Max" button that enables the player to bet a maximum permitted wager. Yet another button 110 may be a "Cash Out" button that enables the player to receive a token payment, a money payment or other suitable form of payment, such as a ticket or voucher, which corresponds to a number of remaining credits. In another example, button 110 includes a "bonus hold" button that enables the player to hold a bonus value associated with gaming machine 100, when other bonus values are re-generated and/or re-assigned.

In the exemplary embodiment, gaming machine 100 includes a coin acceptor 112 for accepting coins and/or tokens, and a paper acceptor 114 for accepting and/or validating cash bills, coupons, tickets, and/or vouchers 116. Paper acceptor 114 may also be capable of printing tickets or vouchers 116. Furthermore, in some embodiments, paper acceptor 114 includes a card reader for use with credit cards, debit cards, identification cards, reward cards and/or smart cards. The cards accepted by paper acceptor 114 may include a magnetic strip and/or a preprogrammed microchip that includes a player's identification, one or more credentials, credit totals, and any other relevant information that may be used.

Moreover, in the exemplary embodiment, gaming machine 100 includes one or more presentation devices 118. Presentation devices 118 are mounted to and/or at least partially within cabinet 102 and controlled by processor 104, and may include a primary presentation device for displaying a primary game and a secondary presentation device for displaying a secondary or bonus game. Presentation devices 118 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user. In the exemplary embodiment, gaming machine 100 includes two presentation devices **118*a* and 118*b*. Presentation device 118*a* is a touch screen device, suitable to display information to a player and incorporates one or more of buttons 110 to receive inputs from the player. In the exemplary embodiment, presentation device 118*b* is suited only to display information, such as a random reward bonus associated with gaming machine 100**.

Presentation device 118 is used to display one or more game images, symbols, a credit status, a gaming status and/or indicia such as a visual representation or exhibition of movement of an object such as a mechanical, virtual, or video reel, dynamic lighting, video images, and the like. Additionally, or alternatively, presentation device 118 displays images and indicia using mechanical means. For example, presentation device 118 may include an electro-mechanical device, such as one or more rotatable reels, to display a plurality of game or other suitable images, symbols, or indicia.

In an exemplary embodiment, presentation devices **118*b* include a random reward bonus display 120, that displays a status of the random reward and/or a status of one or more other players participating in the random reward. Further, presentation devices 118*a* include a credit display 122 that displays a player's current number of credits, cash, account balance, or the equivalent. Additionally, presentation devices 118*a* also include a bet display 124 that displays a player's amount wagered. It should be appreciated that a variety of information related to gaming machine 100 can be displayed at presentation devices 118*a* and 118*b***, in various organizations to engage and/or inform the player.

In one embodiment, processor 104 randomly generates game outcomes using probability data. For example, each game outcome may be associated with one or more probability values that are used by gaming machine 100 to determine the game output to be displayed. Such a random calculation may be provided by a random number generator, such as a true random number generator (RNG), a pseudo-random number generator (PNG), or any other suitable randomization process. Moreover, gaming machines 100 may be terminal-based machines, wherein the actual games, including random number generation and/or outcome determination, are performed at a gaming server (shown in FIG. 3). In such an embodiment, gaming machine 100 displays results of the game via presentation device **118*a* (shown in FIGS. 1 and 2**).

Figure 3:
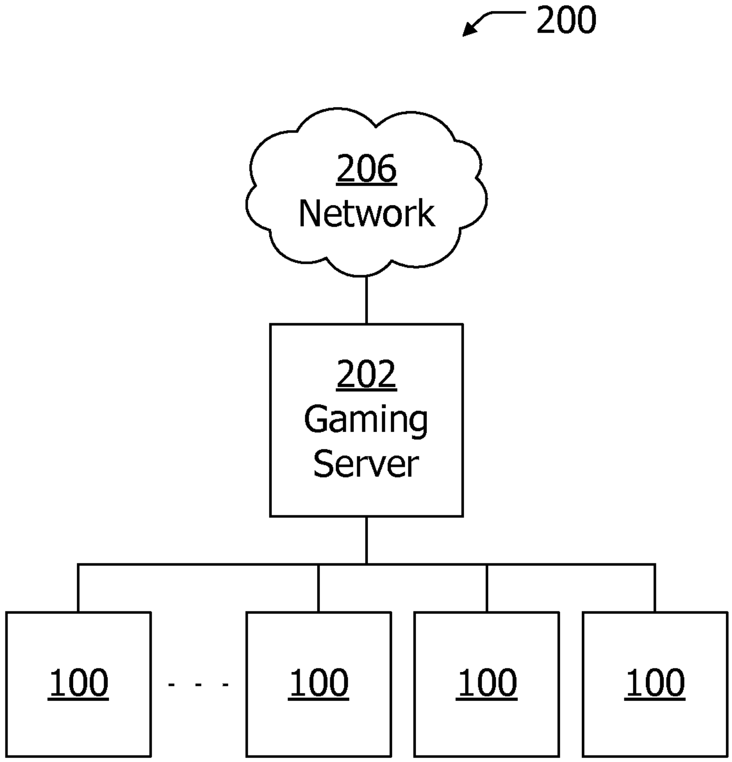
FIG. 3 is a diagram of an exemplary gaming system network.

FIG. 3 illustrates an exemplary gaming system 200, including a gaming server 202 coupled to a plurality of gaming machines 100. Gaming server 202 may perform a plurality of functions including, for example, random reward management, game outcome generation, player tracking functions, and/or accounting functions. Gaming server 202 may include one server or a plurality of servers that together or independently perform one or more of functions described herein. In general, gaming server 202 and gaming machines 100 are present within a gaming location. In other embodiments, one or more of gaming server 202 and/or gaming machines 100 may be spread across multiple gaming locations. In at least one embodiment, gaming machines 100 may be positioned at one or more locations, other than a gaming establishment, such as at bars, convenient stores, gas stations, etc.

In the exemplary embodiment, gaming system 200 also includes a network 206, to which gaming server 202 and gaming machines 100 are coupled. Network 206 may include, without limitation, Internet, Intranet, a local area network (LAN), a cellular network, a wide area network (WAN), etc. It should be appreciated that gaming server 202 includes suitable security software to protect the integrity of gaming server 202, gaming machines 100 and/or any gaming activity associated with gaming server 202 and/or gaming machines 100.

Figure 4:
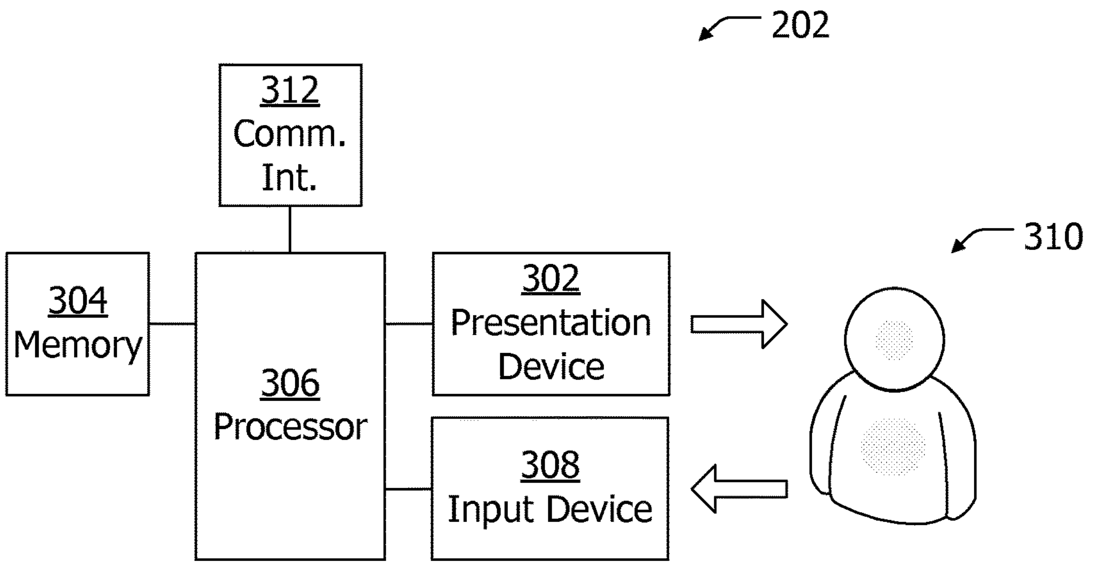
FIG. 4 is a block diagram of an exemplary computing device.

FIG. 4 illustrates a block diagram of an exemplary gaming server 202, that may be used with gaming system 200 of FIG. 3. In the exemplary embodiment, gaming server 202 includes a presentation device 302, a memory 304 and a processor 306 in communication with presentation device 302 and memory 304. Presentation device 302 may include, without limitation, a cathode ray tube (CRT) display, a liquid crystal display (LCD), an organic light emitting diode (OLED) display, or other suitable device for use in presenting information to a user.

Memory 304 is any suitable device that may be used for storing and/or retrieving information, such as executable instructions and/or data, and is generally consistent with memory 106 described above. For example, memory 304 stores data such as a status of the random reward, player tracking account information, eligibility status of gaming server 202, bonus values, random or pseudo-random number generation software, pay table data, and/or other information or applicable gaming rules that relate to game play on gaming server 202. Processor 306 is substantially consistent to processor 104 (as described herein) and may include one or more processing units and may be programmed to perform alone or in combination with any of the processes, methods or functions described with respect to gaming system 200.

Gaming server 202 includes an input device 308 for receiving input from user 310, such as a system administrator, IT professional, etc. Input device 308 may include, without limitation, a keyboard, a pointing device, a mouse, a stylus, a touch sensitive panel (e.g., a touch pad or a touch screen), a gyroscope, an accelerometer, a position detector, and/or an audio input device. A single component, such as a touch screen, may function as both presentation device 302 and input device 308. Further, gaming server 202 includes a communication interface 312, to provide communication between gaming server 202 and gaming machines 100 and/or one or more networks, including, for example, network 206.

Gaming system 200 is usable to provide a random reward. As used herein, the term random reward refers to a secondary game hosted by a gaming entity, which is guaranteed to pay an award, once at least one predetermined condition is satisfied. In general, the random reward is created and managed, at gaming server 202, according to various parameters, which govern payout, participation, bonus ranges, player rating, gaming machines 100, etc. Once the random reward is created, the random reward is appended to the primary games of a number of gaming machines 100, participating in the random reward.

In the exemplary embodiment, the random reward may also include, but is not limited to only including, a random bonus, or any other award that can be based on any number of factors, including random coin-in determination, a predetermined time, a random gaming machine, a random casino, a random player tracking number, and/or any combination of such factors. In one embodiment, the random reward may include bonus feature rounds, win multipliers, or free-spins for the player who triggers the random reward and/or all players associated with the random reward, including a "circle of friends". As used herein, the term player may refer to a small group of individuals that have a relationship, such as a "circle of friends" wherein all are requested to participate in the circle. In such a relationship, generally one player oversees the circle and sends out invitations to form the circle. Such a relationship may be based on any number of factors including a preferred gaming location of the players, the age of the players, the geographic location of the players, and/or any combination of these factors and others. As such, participants in the circle of friends may be at multiple locations, may not participate through traditional casinos, and/or may use multiple devices, including those that participate remotely through the Internet, for example. In another example, participants in the circle of friends could participate through a social media account, such as through Facebook®, for example. It should be noted, that as used herein, the right to participate in the circle of friends is provided to a person and not to a specific device. In at least one embodiment, the random reward may be multiplied by the player's bet when the player triggered the random reward. Additionally, or alternatively, the random reward may be determined by the rewards account of the player triggering the random reward, and/or the rewards accounts of some or all players associated with the random reward. The random reward may be determined and/or modified, by gaming server 202, when the random reward is established, when the random reward is triggered, and/or at some point therebetween.

Figure 5:
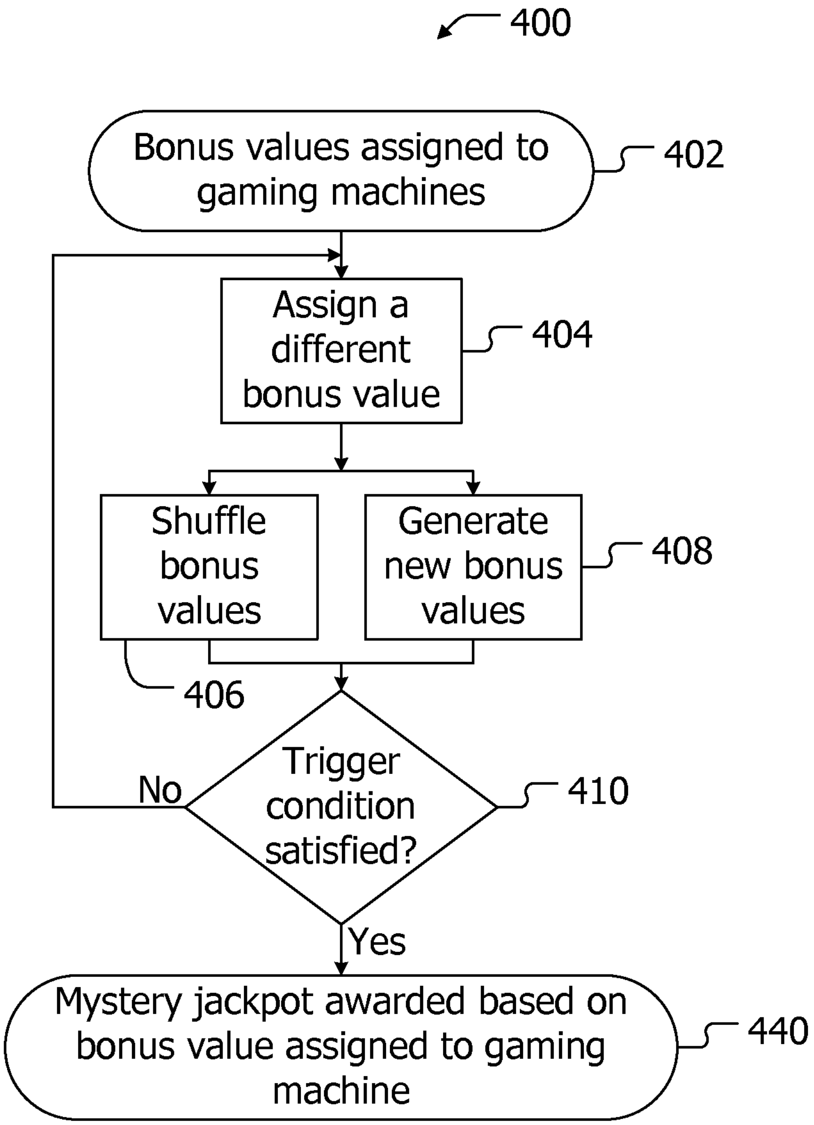
FIG. 5 is a block diagram of exemplary methods that may be used to create a random reward.

FIG. 5 illustrates an exemplary method 400 for providing a random reward to a plurality of players. Method 400 is described herein with reference to gaming machine 100 and gaming system 200. However, it should be appreciated, that method 400 is not limited to the gaming machine 100 and gaming system 200 and may be used with a variety of other gaming machines and gaming systems embodiments. Likewise, gaming machine 100 and/or gaming system 200 should not be understood to be limited to the exemplary system 200 of FIG. 3.

In the exemplary embodiment, gaming server 202 assigns 402 a bonus value to gaming machines 100 participating in the random reward. The bonus value can be any type of potential extra benefit to the random reward award. In the exemplary embodiment, the bonus value is a multiplier, such as, for example, 1×, 2×, 5×, 10×, 50×, 100×, 1000×, etc. The multiplier provides for a multiple of the random reward award when the random reward is triggered. For example, if a random reward is triggered by gaming activity to gaming machine 100, which has a 50× bonus value assigned thereto, the award of the random reward is multiplied by 50 and awarded to the player. It should be appreciated that various different multipliers can be used in other gaming system embodiments.

Gaming server 202 may assign 402 the same bonus value to each gaming machine 100 or one or more different bonus values to gaming machines 100. In at least one embodiment, gaming server 202 assigns 402 a smaller number of bonus values, having a higher worth, as compared to the number of bonus values having a lesser worth. In one example, if eighty gaming machines 100 are participating in a random reward, gaming server 202 may assign a 100× multiplier to one gaming machine 100, a 25× multiplier to four gaming machines 100, a 10× multiplier to fifteen gaming machines 100, and a 1× multiplier to eighty gaming machines 100. In several examples, gaming server 202 may assign 402 multiple different bonus values, including a first multiplier and a second multiplier. Gaming server 202 assigns 402 "n" first multipliers and at least "2n" second multipliers (or at least twice as many second multipliers as first multipliers). In such an example, the first multiplier is greater than the second multiplier, where "n" is an integer. It should be appreciated that gaming server 202 can assign a variety of distribution of different bonus values to gaming machines 100, to facilitate enhancing participation in the random reward, to enhance gaming activity at gaming machines 100 participating in the random reward, and/or to enhance the entertainment value provided through gaming system 200. Moreover, as described in more detail below, it should be appreciated the number, type, and/or participation of gaming machines 100 may vary, prior to, or within the duration of, the random reward, in several embodiments.

After assigning 402 the bonus values to gaming machines 100, gaming server 202 assigns 404 a different bonus value to each of a portion of gaming machines 100, after a predetermined interval. In this manner, the bonus values at gaming machine 100 change occasionally, thus providing another dimension to the random reward and bonus values associated therewith. "Different" bonus values may be assigned 404 to gaming machines 100 in a variety of different manners. As shown in FIG. 5, for example, assigning 404 different bonus values may include shuffling 406 the bonus values among the gaming machines 100. In this example, the previously assigned bonus values are shuffled 406 to different gaming machines, such that each gaming machine 100 is assigned 404 a different bonus value. In one example, gaming machine 100 is assigned 402 a 1× multiplier, and then assigned 404 a 10× multiplier through shuffling 406 the bonus values. In this example, gaming machine 100 has been assigned 404 a different bonus value, because gaming machine 100 is assigned 404 the bonus value shuffled 406 from a different gaming machine 100. Shuffling 406 generally includes the same number of bonus values, shuffled among the same number of gaming machines 100.

Additionally, or alternatively, in some embodiments, gaming server 202 may generate 408 new bonus values, rather than shuffling 406 the original bonus values, and assigns 404 the new bonus values to gaming machines 100 associated with the random reward. In such an embodiment, gaming server 202 adjusts the bonus values for a variety of different reasons, including the random reward award, and/or based on the player interacting with a particular gaming machine 100, etc. For example, bonus values may be at least partially based on the rating of a player interacting with a gaming machine 100. More specifically, in such an example, a gold rated player may be assigned 404 a 2× multiplier as a bonus value, while a platinum rated player at the same gaming machine 100, under the same conditions, may be assigned 404 a 3× multiplier as a bonus value. More specifically, the player rating may be used to generate 408 a bonus value, or enhance a pre-existing bonus value, for gaming machine 100.

In various embodiments, the bonus values may be assigned 404 based on the type of gaming machines 100, the volume of play at particular gaming machines 100, a sponsor of a random reward, and/or a variety of other reasons related to gaming machines 100, gaming system 202, and/or business reasons associated with the gaming. In one example, gaming server 202 assigns 404 higher bonus values to gaming machines receiving less traffic. In another example, gaming server 202 assigns 404 higher overall bonus values during traditionally slow times of the day/week. In still other examples, gaming server 202 assigns 404 bonus levels based on player ratings, prior bonus values, promotional periods, and/or any other reason that facilitates enhancing the award associated with the random reward.

It should be understood that a variety of different process may be used by gaming server 202 to shuffle 406, generate 408, or otherwise assign 404 different bonus values to gaming machines associated with a random reward. For example, gaming server 202 may shuffle 406 the bonus values after a predetermined time period or interval has elapsed. The predetermined interval may be any suitable interval for assigning bonus values to gaming machines 100. For example, the predetermined interval may be about 30 seconds, about 3 minutes, about 25 minutes, about an hour, or any other shorter or longer intervals, potentially depending on the random reward, the availability of gaming machines 100 associated with the random reward, and/or other conditions related or unrelated to enhancing play of gaming machines 100 associated with the random reward and/or rewarding players having particular ratings.

In some embodiments, a bonus value is preserved at gaming machine 100, even after the predetermined interval has elapsed. For example, a player may be able to retain the bonus value associated with the gaming machine, by selecting the "bonus hold" button 110. In this manner, a player is able to interact with gaming machine 100, until a high bonus value (e.g., 50× multiplier) is assigned 404 to gaming machine 100, and then retain that bonus value for further gaming activity. The option of retaining the bonus value may be restricted to players having certain ratings (e.g., silver, gold, and/or platinum) and/or certain retention intervals, after which the bonus value is released. In at least one embodiment, the "bonus hold" button 110 may be used to release the bonus value, to permit the player to pursue a better bonus value, through shuffling 406 or generation 408 of bonus values.

As gaming activity is provided to gaming machines 100, the trigger condition of the random reward is eventually satisfied. When the trigger condition is satisfied, gaming server 202 triggers 410 the random reward and awards 440 the random reward based on the bonus value assigned to gaming machine 100, thus triggering 410 the random reward. More specifically, for example, gaming server 202 multiplies the random reward by the multiplier of the bonus value. As should be apparent, the potential for triggering 410 the random reward, with dynamic bonus values, may provide enhanced entertainment to the primary game at gaming machine 100, as well as the random reward machine.

Several different trigger conditions may be employed to trigger 410 the random reward at gaming server 202. In one example, gaming server 202 includes a random number generator, at processor 306, executed through hardware, software and/or firmware. As gaming activity is accrued to gaming machines 100, gaming server 202 generates random numbers. When the randomly generated number exceeds a threshold value, the trigger condition is satisfied. As such, if the threshold value is the only trigger condition, the gaming machine 100 that facilitated generation of the random number exceeding the threshold value is determined to be the winning gaming machine.

Additionally, or alternatively, gaming server 202 may include one or more additional or alternative trigger conditions. For example, a trigger condition may be based on whether the gaming machine 100 facilitating another trigger condition is an eligible gaming machine. In one or more embodiments, gaming server 202 designates one or more gaming machines 100 as eligible for an eligibility interval. The eligibility interval may provide that select gaming machines 100 are eligible to trigger the random reward, and/or an interval of time in which gaming machines 100 are able to trigger the random reward. The eligibility interval may be assigned to one or more gaming machines 100, and/or to various time intervals, for example, to enhance participation in the random reward and/or encourage gaming activity at traditionally slower times of the day/week. Additionally, or alternatively, the eligibility interval may be set and/or adjusted to affect the probability of triggering 410 the random reward. The eligibility interval may be displayed to the player at presentation interface 118*b*, for example, or kept secret and/or internal to gaming server 202.

In the exemplary embodiment, gaming server 202 may alter the gaming machines 100 associated with a random reward during a random reward game play. More specifically, in one embodiment, a specific number of gaming machines 100 participate in a random reward, and are assigned 402 bonus values for the random reward. In at least one embodiment, gaming server 202 alters which gaming machines 100 are included in the random reward. In this manner, players may be encouraged to search through a gaming location to find gaming machines 100 included in the random reward. Further, gaming server 202 can alter which gaming machines 100 are included in the random reward to guide players to less popular and/or less played gaming machines 100 at a gaming location. In some embodiments, gaming machines included in the random reward remain static through the random reward, until the random reward is awarded 440.

The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A machine or server, such as those described herein, includes at least one processor or processing unit and a system memory. The machines or server typically has at least some form of non-transitory computer readable media, such as memory 106 or memory 304. By way of example and not limitation, computer readable media includes, for example, a non-transitory computer storage device. Computer storage media include volatile and nonvolatile, removable and non-removable media implemented in any method or technology for storage of information such as computer readable instructions, data structures, program modules, or other data in a device.

Although the present disclosure is described in connection with an exemplary gaming system, embodiments herein are operational with numerous other general purpose or special purpose gaming system or configurations. The gaming system is not intended to suggest any limitation as to the scope of use or functionality of any aspect described herein. Moreover, the gaming system should not be interpreted as having any dependency or requirement relating to any one or combination of components illustrated in FIGS. 1-4.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method for use in awarding a random reward to a first player during play of a primary game, said method implemented using a gaming server including a processor, a memory device, and a random number generator, the gaming server communicatively networked to a plurality of gaming machines participating in the random reward and configured to operate the primary game, said method comprising:

associating in the memory device, by the gaming server, the random reward with at least one gaming machine of the plurality of gaming machines, the at least one gaming machine being operated by the first player, wherein the at least one gaming machine includes at least one of a coin acceptor, a bill validator, a card reader, and a ticket reader for establishing a first credit balance, from which a first wager is accepted for admitting the first player to the primary game;

generating, at the gaming server, a first plurality of bonus values and a second plurality of bonus values using the random number generator, the first plurality of bonus values and the second plurality of bonus values configured to enhance the random reward;

assigning, by the gaming server, the first plurality of bonus values to the at least one gaming machine;

determining that a trigger condition within the primary game is satisfied at the at least one gaming machine;

in response to the trigger condition being satisfied, awarding the random reward to the first player, wherein the awarded random reward is enhanced by at least one bonus value of the first plurality of bonus values; in response to the awarding of the random award, substituting, by the gaming server, the second plurality of bonus values for the first plurality of bonus values at the at least one gaming machine; and in response to the substitution, prompting the first player to play the primary game using the second plurality of bonus values.

2. The method of claim 1, further comprising assigning, at a gaming server, the first plurality of bonus values to each of the plurality of gaming machines.

3. The method of claim 2, wherein assigning the first plurality of bonus values to each of the plurality of gaming machines comprises assigning the first plurality of bonus values to each of the plurality of gaming machines at least partially based on gaming activity at each of the plurality of gaming machines.

4. The method of claim 1, further comprising:

upon assigning the first plurality of bonus values, enabling the first player to hold or release the first plurality of bonus values, wherein the holding of the first plurality of bonus values is restricted to at least one of a holding interval and a player's rating.

5. The method of claim 4, further comprising re-shuffling each bonus value of the released first plurality of bonus values between each of the plurality of gaming machines that released their respective bonus values.

6. The method of claim 1, further comprising identifying a set of the plurality of gaming machines as being eligible to satisfy the triggering condition, wherein a number of gaming machines in the set of the plurality of gaming machines is less than a number of gaming machines in the plurality of gaming machines.

7. The method of claim 6, further comprising presenting an eligibility notification to each gaming machine in the set of the plurality of gaming machines during a time period in which each of the gaming machines in the set of the plurality of gaming machines are eligible to trigger the triggering condition.

8. A gaming system for awarding a random reward to a first player of a plurality of players during play of a primary game, said gaming system comprising:

a plurality of gaming machines participating in the random reward, each of said plurality of gaming machines is configured to:

establish a first credit balance using at least one of a coin acceptor, a bill validator, a ticket reader, and a card reader for each gaming machine, receive a first wager from the first credit balance for a first player for play of the primary game, conduct the primary game and award the first player according to a game outcome, and display a bonus value; and a gaming server including a processor, a memory device, and a random number generator, said gaming server coupled to said plurality of gaming machines, said gaming server configured to:

associate, in the memory device, the random reward with at least one gaming machine of said plurality of gaming machines, said at least one gaming machine being operated by the first player;

generate a first plurality of bonus values and a second plurality of bonus values using the random number generator, the first plurality of bonus values and the second plurality of bonus values configured to enhance the random reward;

assign the first plurality of bonus values to the at least one gaming machine;

determine that a trigger condition within the primary game is satisfied at the at least one gaming machine;

in response to the trigger condition being satisfied, award the random reward to the first player, wherein the awarded random reward is enhanced by at least one bonus value of the first plurality of bonus values;

in response to the awarding of the random award, substitute the second plurality of bonus values for the first plurality of bonus values at the at least one gaming machine; and in response to the substitution, prompt the first player to play the primary game using the second plurality of bonus values.

9. The gaming system of claim 8, wherein said gaming server is further configured to assign the first plurality of bonus values to each of the plurality of gaming machines.

10. The gaming system of claim 9, wherein assigning the first plurality of bonus values to each of the plurality of gaming machines comprises assigning the first plurality of bonus values to each of the plurality of gaming machines at least partially based on gaming activity at each of the plurality of gaming machines.

11. The gaming system of claim 8 wherein said gaming server is configured to, upon assigning the first plurality of bonus values, enable the first player to hold or release the first plurality of bonus values, and wherein the holding of the first plurality of bonus values is restricted to at least one of a holding interval and a player's rating.

12. The gaming system of claim 8, wherein said gaming server is configured to identify a set of the plurality of gaming machines as being eligible to satisfy the triggering condition, wherein a number of gaming machines in the set of the plurality of gaming machines is less than a number of gaming machines in the plurality of gaming machines.

13. The gaming system of claim 12, wherein said gaming server is configured to present an eligibility notification to each gaming machine in the set of the plurality of gaming machines during a time period in which each of the gaming machines in the set of the plurality of gaming machines are eligible to trigger the triggering condition.

14. A non-transitory computer-readable medium comprising instructions that cause one or more processors to perform the steps of:

associating, by the gaming server, the random reward with at least one gaming machine of the plurality of gaming machines, the at least one gaming machine being operated by the first player, wherein the at least one gaming machine is configured to operate a primary game, wherein the at least one gaming machine includes at least one of a coin acceptor, a bill validator, a card reader, and a ticket reader for establishing a first credit balance, for a first player, from which a first wager is accepted for admitting the first player to a primary game;

generating a first plurality of bonus values and a second plurality of bonus values using a random number generator, the first plurality of bonus values and the second plurality of bonus values configured to enhance the random reward;

assigning the first plurality of bonus values to the at least one gaming machine;

determining that a trigger condition within the primary game is satisfied at the at least one gaming machine;

in response to the trigger condition being satisfied, awarding the random reward to the first player, wherein the awarded random reward is enhanced by at least one bonus value of the first plurality of bonus values;

in response to the awarding of the random award, substituting the second plurality of bonus values for the first plurality of bonus values at the at least one gaming machine; and in response to the substitution, prompting the first player to play the primary game using the second plurality of bonus values.

15. The non-transitory computer-readable medium of claim 14, wherein the instructions cause the one or more processors to assign the first plurality of bonus values to each of the plurality of gaming machines included in a random reward circle.

16. The non-transitory computer-readable medium of claim 15, wherein assigning the first plurality of bonus values includes shuffling the first plurality of bonus values between the gaming machines included in the random reward circle.

17. The non-transitory computer-readable medium of claim 15, wherein the instructions cause the one or more processors to, upon assigning the first plurality of bonus values, enable the first player to hold or release the first plurality of bonus values, and wherein the holding of the first plurality of bonus values is restricted to at least one of a holding interval and a player's rating.

18. The non-transitory computer-readable medium of claim 17, wherein the instructions cause the one or more processors to re-shuffle each bonus value of the released first plurality of bonus values between each of the plurality of gaming machines where their respective bonus values were released.

19. The non-transitory computer-readable medium of claim 14, wherein the instructions cause the one or more processors to identify a set of the plurality of gaming machines as being eligible to satisfy the triggering condition, wherein a number of gaming machines in the set of the plurality of gaming machines is less than a number of gaming machines in the plurality of gaming machines.

20. The non-transitory computer-readable medium of claim 19, wherein the instructions cause the one or more processors to present an eligibility notification to each gaming machine in the set of the plurality of gaming machines during a time period in which each of the gaming machines in the set of the plurality of gaming machines are eligible to trigger the triggering condition.

21. The gaming system of claim 11, wherein said gaming server is configured to re-shuffle each bonus value of the released first plurality of bonus values between each of the plurality of gaming machines where their respective bonus values were released.

* * * * *